United States Patent Office

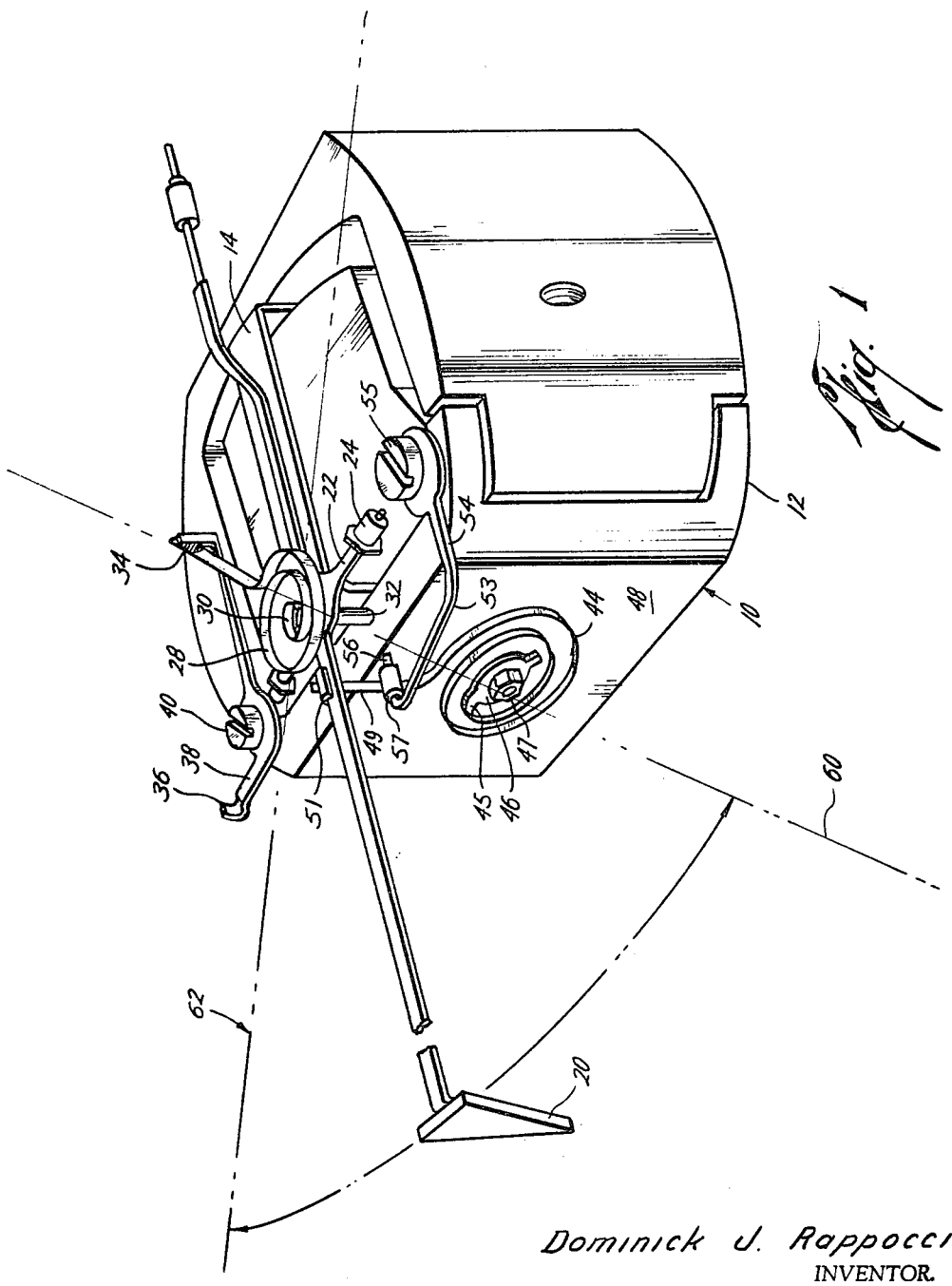

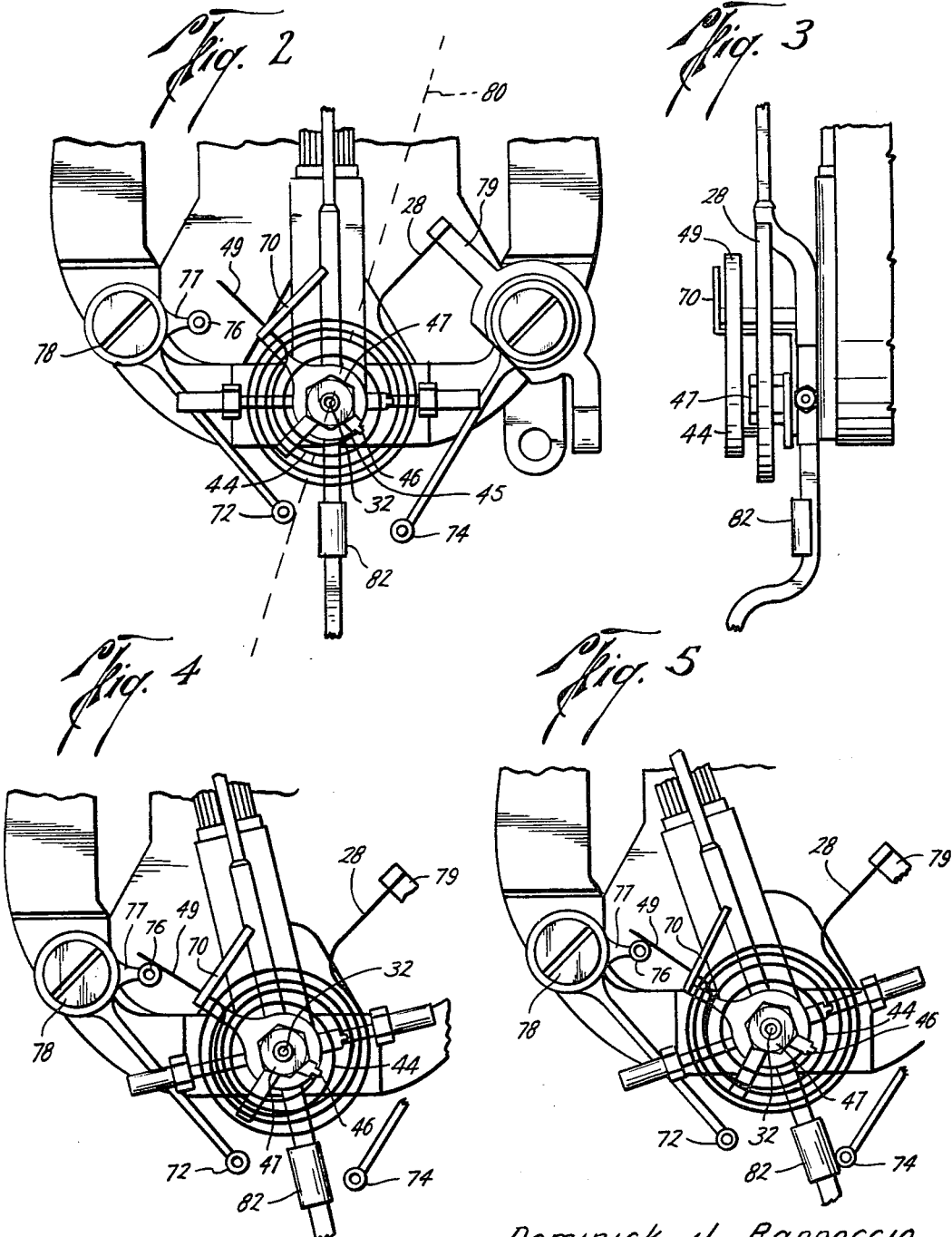

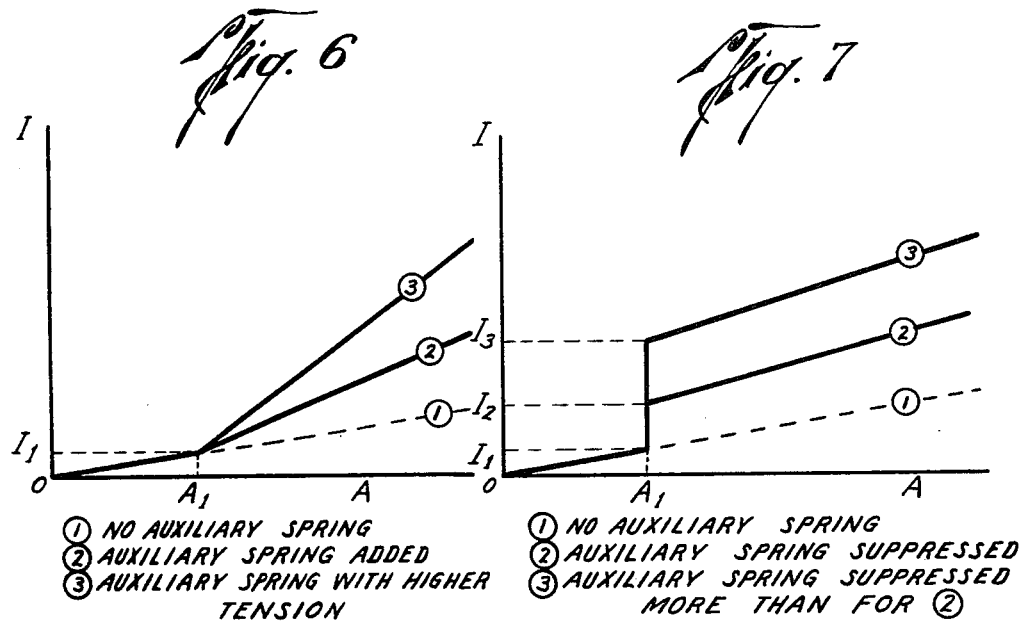
① NO AUXILIARY SPRING
② AUXILIARY SPRING ADDED
③ AUXILIARY SPRING WITH HIGHER TENSION
① NO AUXILIARY SPRING
② AUXILIARY SPRING SUPPRESSED
③ AUXILIARY SPRING SUPPRESSED MORE THAN FOR ②
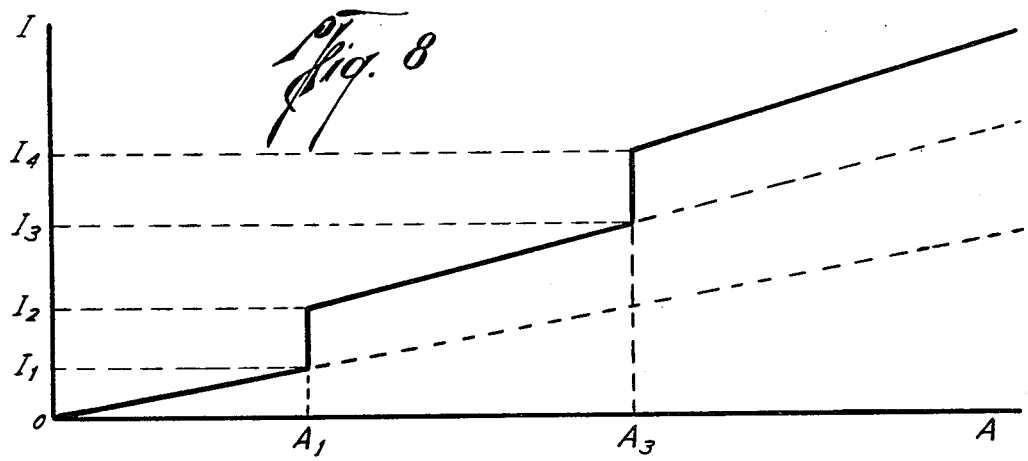
TWO AUXILIARY SPRINGS ADDED
Dominick J. Rappoccio
INVENTOR.
BY Michael P. Breston
ATTORNEY

3,390,332
Patented June 25, 1968

3,390,332
SUPPRESSED SCALE ELECTRICAL INSTRU-
MENT WITH ADJUSTABLE AUXILIARY
SPRING MEANS
Dominick J. Rappoccio, Roselle Park, N.J., assignor to
Weston Instruments, Inc., a corporation of Texas
Filed Feb. 17, 1964, Ser. No. 345,195
3 Claims. (Cl. 324—132)

ABSTRACT OF THE DISCLOSURE

A suppressed or depressed scale meter including a mechanical scale suppression or depression control. The control includes an auxiliary spring with an end that engages a stop on the meter frame positioned to suppress scale deflection of the pointer after a predetermined initial deflection of the pointer. The stop is adjustable to enable precise setting of the point at which suppression begins. In a first embodiment the auxiliary spring has one end adjustably secured to the pointer pivot for movement with the pointer and its other or free end engages a tab fixed to the pointer that prevents the spring from unwinding. The free end engages the stop after a predetermined pointer deflection. In the second embodiment the one end of the spring is adjustably secured to the frame and the pointer engages the free end at the start of the suppressed scale.

This invention relates to electrical indicating instruments of the moving-coil or the D'Arsonval type and more particularly to such instruments with nonlinear scales, that is, having some portion of their scale suppressed and/or contracted.

Nonlinear scale, moving-coil type instruments are known. Generally, a nonlinear scale instrument is achieved by establishing a variable width air gap between the magnetic core member associated with the moving coil and the yoke member positioned adjacent to the core. Because the width of the air gap varies over the range of angular movement of the coil, the coil's angular displacement per unit change of measured electrical current also varies in dependence upon the width of the air gap along the arcuate trajectory of the moving coil. It will be appreciated that nonlinear scale instruments of this general type require careful adjustment of the air gap for each instrument. Such calibration, however, is wasteful of both time and money.

Other known nonlinear scale D'Arsonval type instruments are made with a substantially uniform air gap, the non-linear effect, however, is achieved by passing the measured current through an electronic network prior to allowing the current to flow through the moving coil. The electronic network employs differently valued components dependent upon the type of nonlinearity desired. This method is primarily objectionable because the electronic network consumes a portion of the measured current and secondarily, because the electronic network, if mounted inside the instrument housing renders the instrument less compact.

These and other disadvantages of the prior art nonlinear scale instruments are overcome by this invention which provides in D'Arsonval type instruments one or more auxiliary springs. One end of such an auxiliary spring may be adjustably secured to the frame of the instrument and the other end is made to act in conjunction with an adjustable abutment as an arrestor of the moving coil when the measured current reaches a predetermined value. To overcome the torque produced by such an auxiliary spring, a sufficient quantity of current must flow through the moving coil to produce a counter torque. Inasmuch as the counter torque required to overcome the torque produced by the auxiliary spring depends primarily on the auxiliary spring's characteristics, various scale characteristics may be readily provided.

Further objects and advantages of this invention will become apparent from the following description taken in conjunction with the accompanying drawings wherein:

FIG. 1 is a perspective view of one embodiment of the invention;

FIG. 2 is a top view of another embodiment of the invention;

FIG. 3 is a side view of the embodiment shown in FIG. 2;

FIG. 4 is similar to FIG. 2 and illustrates the respective positions of the moving coil and of the auxiliary spring when the current flowing through the moving coil is insufficient to overcome the torque provided by the auxiliary spring;

FIG. 5 is similar to FIG. 4 and shows the relative positions of the moving coil and of the auxiliary spring when the current flowing through the moving coil produces a counter torque greater than the torque produced by the auxiliary spring; and FIGS. 6–8 are graphs illustrating typical deflection rate characteristics obtainable with instruments constructed in accordance with this invention.

Referring to FIG. 1, there is shown a meter movement, generally designated as 10, of known construction. As will be understood by those skilled in the art, the meter movement 10 may assume any modified form suitable for specific applications. Inasmuch as the construction of the meter movement per se forms no part of this invention, except as hereinafter indicated, only a brief description thereof will be given. A paramagnetic frame 12 is provided for supporting the various elements of the meter movement. A movable coil 14 is pivotally mounted on frame 12 by means of bearing members in any conventional manner. A suitable pointer 20 is fixedly secured to the movable coil 14 for rotation therewith. For dynamically balancing the coil 14, there is provided an arm 22 to the ends of which are secured counter weights 24. Coil 14 is urged to a zero position by means of two spiral springs 28. Only the upper spring 28 is shown. One end 30 of spring 28 is secured to a tab which is electrically connected to the movable coil 14 through a nut fastened to a pivot 32. The other end 34 of spring 28 is soldered to a current receiving terminal 36 via a conductor arm 38 bolted to the frame 12 by a screw 40. When a current flows through coil 14, its rotation is resiliently opposed by the action of the spiral springs 28 which provide a resisting torque proportional to the amount of the coil's deflection from the zero position.

As previously mentioned, it is often desired to be able to measure with a single coil such as 14 currents up to a first level for which the moving coil has one deflection rate, and currents up to a second level for which the moving coil has another deflection rate. This is accomplished in accordance with this invention by providing one or more auxiliary springs conveniently mounted on the frame 12 in such a manner that each end of the auxiliary spring can be adjustably secured to provide different tension characteristics, thereby modifying the rate of displacement of the moving coil 14 along its angular trajectory.

In FIG. 1 there is provided an auxiliary spiral spring 44 of which one end 45 is clamped to a tab 46 which is secured by a screw 47 to the front wall 48 of frame 12. The other end 49 of the spiral spring 44 is flattened out so as to be in a plane substantially parallel with the plane of coil 14. To minimize the friction between the flattened end 49 and the pointer arm 20 when the two establish contact, there is provided on pointer arm 20 an insulating bead 51. To maintain the flattened end 49 in a predetermined plane, a U-shaped abutment member 53 of which one leg 54 is bolted to the frame 12 by a bolt 55 and the other leg 56 carries an insulating bead 57. The flattened portion 49 of the spiral spring 44 abuts against the other cylindrical surface of the bead 57 as shown.

When the pointer 20 assumes its zero position as indicated by the broken line 60, the pointer is disengaged from the auxiliary spring 44. When a current is applied to the input terminal 36, the coil starts to rotate and, hence the pointer 20 moves away from its zero position at a rate dependent upon the characteristics of springs 28. When the current reaches a predetermined level $I_1$, the pointer 20 becomes sufficiently displaced to contact the flattened end 49 of the auxiliary spring 44. To overcome the torque produced by the auxiliary spring 44, the current flowing in the moving coil 14 must produce a counter torque which is greater than the torque of spring 44. Let $I_2$ be the current necessary to establish equality between the torque of the moving coil 14 and the torque of spring 44. Then when the current flowing in coil 14 exceeds $I_2$, the coil will again be allowed to move along its angular trajectory until its limit excursion as indicated by line 62. The rate of displacement of pointer 20 for currents exceeding $I_2$ will depend largely on the elastic characteristics of the auxiliary spring 44. The tension of spring 44 may be adjusted by rotating the tab 46 either in a clockwise or counterclockwise direction.

The operation of the embodiment shown in FIG. 1 will be better understood by reference to FIGS. 6 and 7. In FIG. 6, curve 1 is a graph of the angular displacement A as a function of the current flowing in the moving coil 14 when no auxiliary springs are added. With no auxiliary springs added and with a substantially uniform air gap, the angular displacement A as a function of current I is linear. Curve 2 in FIG. 6 illustrates the operation of a meter with an auxiliary spring added but without scale suppression. Thus, during the period when the pointer 20 moves away from its zero position until it establishes contact with the auxiliary spring 44 in response to a current I, its deflection rate is the same as in the case illustrated by curve 1. When the pointer 20 makes contact with the flattened end 49 of auxiliary spring 44, the deflection rate of pointer 20 decreases because of the additional torque provided by the auxiliary spring 44. In other words, to continue to deflect the moving coil, it now takes more current per angular unit of pointer displacement along its trajectory.

If a lower deflection rate is desired, the tab 46 in FIG. 1 is rotated clockwise and then fastened by screw 47 to frame 12. Curve 3 in FIG. 6 illustrates the resulting operation for a deflection rate lower than that illustrated by curve 2.

FIG. 7 is similar to FIG. 6 except that whereas in FIG. 6 it was assumed that the moving coil 14, when stopped by the flattened portion 49, was able to produce an instantaneous counter torque, in response to an incremental increase in the current flowing therethrough, of sufficient value to overcome the torque produced by the auxiliary spring 44, in FIG. 7 it is assumed that when the current reaches the value $I_1$, the angular displacement is $A_1$, and for all currents between $I_1$ and $I_2$, the torque produced by the moving coil 14 is insufficient to overcome the torque of spring 44. For currents greater than $I_2$, the coil will continue its displacement along its angular trajectory. Thus, the portion of the scale between $I_1$ and $I_2$ is suppressed as shown by curve 2 in FIG. 7. Curve 1 of FIG. 7 is similar to curve 1 of FIG. 6. Again, if additional suppression is desired, the tab 46 is rotated clockwise as previously described. The resulting operation is illustrated by curve 3 wherein the portion of the scale between $I_3$ and $I_1$ is suppressed.

Referring back to FIG. 1, the auxiliary spring 44 is shown as being mounted on the front wall 48 of the frame 12. Actually, it is more convenient to mount the auxiliary spring on the pivot 32 as shown in FIGS. 2 through 5 wherein the same reference characters are used to denote the same parts to simplify the drawings. That the two springs 28 and 44 are in two distinct parallel planes can be best seen from FIG. 3. The flattened end 49 of the auxiliary spring 44 is now in abutment against an L-shaped tab 70 as shown. Tabs 46 and 70 are secured to pivot 32 by the nut 47 for rotation with the pointer 20. Insulating sleeve 72 is a stop bead for the pointer 20 when it is at its zero position. Insulating sleeve 74 is a stop bead when the pointer 20 is at its extreme position, and 76 is a stop bead for the flattened end 49 of the auxiliary spring 44. The location of the stop bead 76 which forms an abutment element and which is mounted on an extension 77 may be adjusted by a screw 78 thereby allowing for selective adjustment of the point of contact between end 49 and bead 76.

In FIG. 2, the main spring 28 has one of its ends secured to a tab 79 and the other end to a tab, not shown, centered on pivot 32 in a conventional manner. Inasmuch as the similarities between the embodiments shown in FIGS. 1 and 2 are apparent, no further description is believed to be necessary.

In operation, when the moving coil 14 is at its zero position, as indicated by the line 80, the bead 82 on pointer 20 rests against bead 72. In response to an input current, the pointer 20 moves away from its rest position until the flattened end 49 of the auxiliary spring 44 abuts against bead 76, as shown in FIG. 4 for a value of current $I_1$. If no suppression of the scale is desired, the coil will proceed along its angular trajectory but at a decreased deflection rate. When the current is sufficient to overcome the torque produced by the auxiliary spring 44, the L-shaped lug 70, which is rotatably mounted with coil 14 on pivot 32, becomes separated from the spring's end 49, as shown in FIG. 5. If greater suppression is desired, the tab 46 is rotated in a counterclockwise direction to increase the tension on the auxiliary spring 44.

Although in the embodiments shown in FIGS. 1 and 2, only a single auxiliary spring is shown, it will be appreciated that on a single meter movement two auxiliary springs may be added to obtain a combined deflection characteristics. The graph shown in FIG. 8 illustrates the operation of a meter with two auxiliary springs. When the current reaches $I_1$, the first spring would arrest the further displacement of the moving coil until a current $I_2$ is applied sufficient to overcome the torque of the first auxiliary spring. Thereafter the coil would continue its displacement along its angular trajectory. When the current reaches a value $I_3$, the second spring will arrest the motion of coil 14. For currents between $I_3$ and $I_4$, the scale is again suppressed. When the current exceeds $I_4$, the moving coil resumes its angular displacement.

While this specification sets forth in detail the present preferred embodiments of this invention, other embodiments will readily suggest themselves to persons skilled in the art without departing from the scope of the appended claims.

What is claimed is:

1. In an electrical indicating instrument of the D'Arsonval type including a pair of input terminals, a frame, a mechanism connected to the input terminals and supported by the frame, the mechanism having a fixed assembly and a movable assembly cooperating with the fixed assembly for producing rotation of said movable assembly when the electrical energy is applied to said input terminals; said movable assembly including a pointer to provide a measure of the electrical input to said input terminals; said pointer being mounted on a bearing supported pivot assembly, and control springs mounted on said pivot assembly; the improvement comprising, mechanical control means to vary the deflection characteristics of said pointer along a portion of the travel of the pointer in response to electrical energy applied to said input terminals, an adjustable abutment element on said frame; said mechanical control means including at least one auxiliary spiral spring having a first end and a second end; said first end being movable between a first position in which said end engages said abutment element, and a second position in which said end is spaced from said abutment element; means to adjustably secure said second end relative to said first end, when said first end is in one of said positions; a portion of said movable assembly engaging said first end of said auxiliary spring to move same from one of said positions to the other during a predetermined portion of the travel of said pointer.

2. An indicating instrument according to claim 1 wherein said adjustable abutment element is a U-shaped member, said first end of said auxiliary spring is urged toward and engages a leg of said U-shaped member when said first end is in said first position; said portion of said movable assembly engaging said first end is said pointer, and said auxiliary spring opposes movement of said pointer in a direction to move said first end away from said arm.

3. An indicating instrument according to claim 1 wherein said portion of said movable assembly engaging said first end of said auxiliary spring is an L-shaped tab secured to said movable assembly for pivotal movement therewith; and said auxiliary spring opposes movement of said pointer after movement of said first end from said second position to said first position.

References Cited

UNITED STATES PATENTS

| | | | |
|---|---|---|---|
| 549,919 | 11/1895 | Howell | 324—131 |
| 1,708,900 | 4/1929 | Roller | 324—154 X |
| 2,658,179 | 11/1953 | Eadle | 324—132 |

FOREIGN PATENTS

| | | |
|---|---|---|
| 185,879 | 6/1956 | Austria. |
| 178,860 | 10/1906 | Germany. |

RUDOLPH V. ROLINEC, *Primary Examiner.*

G. R. STRECKER, *Assistant Examiner.*